United States Patent [19]
Iwabuchi

[11] Patent Number: 6,070,618
[45] Date of Patent: Jun. 6, 2000

[54] HIGH PRESSURE FUEL INJECTION PIPE AND A METHOD OF MANUFACTURING THE SAME

[75] Inventor: Katsuhiro Iwabuchi, Ito, Japan

[73] Assignee: Usui Kokusai Sangyo Kaisha Limited, Japan

[21] Appl. No.: 09/028,140

[22] Filed: Feb. 23, 1998

[30] Foreign Application Priority Data

Feb. 26, 1997 [JP] Japan ................................. 9-058510

[51] Int. Cl.$^7$ ............................................. F16L 9/18
[52] U.S. Cl. ................................. 138/143; 138/177
[58] Field of Search ............................. 138/109, 143, 138/140, 177

[56] References Cited

U.S. PATENT DOCUMENTS

| | | | |
|---|---|---|---|
| 4,134,430 | 1/1979 | Mukasa et al. | 138/109 |
| 4,266,577 | 5/1981 | Usui | 138/109 |
| 5,109,888 | 5/1992 | Usui | 138/109 |
| 5,265,793 | 11/1993 | Usui et al. | 138/143 X |
| 5,402,829 | 4/1995 | Takikawa et al. | 138/109 |

*Primary Examiner*—Lesley D. Morris
*Attorney, Agent, or Firm*—Anthony J. Casella; Gerald E. Hespos

[57] ABSTRACT

A sufficient anti-cavitation performance can be performed even when a high pressure fuel equal to or more than the value expected in the prior art, an extension can be recovered by a heating operation even when a pipe extension is processed to a limit of an extension so as to make a formation of the connection head portion in a connection end portion easy, and a necessary bending process at a time of arranging near a diesel engine can be performed. In a high pressure fuel injection pipe constituted by forming a connection head portion having a frusto-conical shape, a circular arc shape or a counter shape in a connection end portion comprising a double metal pipe constituted by press-fitting a thin internal pipe to an external pipe made by a thick steel pipe, the internal pipe is made of an austenitic stainless steel pipe thermally spring refined, and in a method of manufacturing a high pressure fuel injection pipe, the method comprises a step of inserting an internal pipe made of a thin austenitic stainless steel pipe to an external pipe made of a thick steel pipe, a step of forming a double metal pipe by press-fitting both pipes by means of a pipe extension process, a step of heating a whole of the double metal pipe so as to thermally spring refining the internal pipe made of a stainless steel pipe, and a step of forming a connection head portion having a frusto-conical shape, a circular arc or a counter shape in the double metal pipe connecting end portion.

12 Claims, 2 Drawing Sheets

HIGH PRESSURE FUEL INJECTION PIPE AND A METHOD OF MANUFACTURING THE SAME

BACKGROUND OF THE INVENTION

1. Field of the Invention

The present invention relates to a high pressure fuel injection pipe disposed in such a manner as to connect to nozzle holders respectively arranged near a cylinder head and near a fuel pump for a fuel supply passage in a diesel engine and having a relatively narrow pipe diameter equal to or less than 20 mm, and to a method of manufacturing the same.

2. Description of the Prior Arts

Conventionally, as this kind of high pressure fuel injection pipe for a diesel engine, Japanese Patent Examined Publication No. 1-46712 belonged to the applicant of this application has been known. The high pressure fuel injection pipe described in this publication is structured such that a double metal pipe is constituted by press-fitting a thin internal pipe made by a stainless steel pipe and having a communication passage formed therein into an external pipe made by a thick steel pipe, and a thickness of the internal pipe is set to be 1.2 to 8.5% of an outer diameter of whole of the double metal pipe.

Then, the high pressure fuel injection pipe described in this publication can prevent a cavitation, erosion and corrosion (hereinafter, refer to a cavitation) from generating on an inner peripheral surface even when the high pressure fuel injection pipe is operated under a recent condition for increasing a fuel injection pressure as a measure for reducing NOx and a black smoke of 1 to 2 mile second of an injection time, 50 m/sec of a maximum flow speed and 600 to 1000 bar (a peak pressure) of an internal pressure, and can substantially satisfy a durability against a repeated high pressure fatigue.

However, a trend of increasing a pressure of a fuel has been further significant, and it is expected that a high pressure fuel injection pipe which can obtain a performance of standing against the cavitation even in a condition of 800 to 1400 bar (a peak pressure) of an internal pressure is provided. Accordingly, there is a possibility that the injection pipe described in the above publication can not sufficiently operate an anti-cavitation performance in this high pressure condition.

Further, there is a problem that at a time of forming a connection head portion of an injection pipe material constituted by a double metal pipe, a formation is hard since a work hardening together with forming an extension pipe is generated in the injection pipe material.

SUMMARY OF THE INVENTION

An object of the present invention is to provide a high pressure fuel injection pipe which can sufficiently perform an anti-cavitation performance even when a high pressure fuel equal to or more than the value expected in the publication mentioned above, can recover its extension by a heating operation even when a pipe extension is processed to a limit of an extension so as to make a formation of the connection head portion in a connection end portion easy, and can be performed a necessary bending process at a time of arranging near a diesel engine, and a method of manufacturing the same.

In order to achieve the object mentioned above, in accordance with a first aspect of the invention, there is provided a high pressure fuel injection pipe constituted by forming a connection head portion having a frusto-conical shape, a circular arc shape or a counter shape in a connection end portion comprising a double metal pipe constituted by press-fitting a thin internal pipe to an external pipe made by a thick steel pipe, in which the internal pipe is made of an austenitic stainless steel pipe thermally spring refined.

Further, in accordance with a second aspect, there is provided a method of manufacturing a high pressure fuel injection pipe comprising a step of inserting an internal pipe made of a thin austenitic stainless steel pipe to an external pipe made of a thick steel pipe, a step of forming a double metal pipe by press-fitting both pipes by means of a pipe extension process, a step of heating a whole of the double metal pipe so as to thermally spring refining the internal pipe made of a stainless steel pipe, and a step of forming a connection head portion having a frusto-conical shape, a circular arc or a counter shape in the double metal pipe connecting end portion, and there is provided a method of manufacturing a high pressure fuel injection pipe in which the heating process is performed at a temperature of 375 to 455° C. and for 10 minutes to 24 hours.

As mentioned above, in accordance with the present invention, since after press-fitting the internal pipe made of a thin austenitic stainless steel pipe to the external pipe made of a thick steel pipe by a pipe extension process, the internal pipe made of a stainless steel pipe is thermally spring refined by a heating process, a hardness of the internal pipe is increased so as to improve an anti-cavitation performance, and further, an extension reduced by a work hardening together with an extension pipe process with relation to the heating process is recovered so that a formation of the connection head portion in the connection end portion is made easy, and a necessary bending process can be performed at a time of arranging a pipe near the diesel engine.

BRIEF DESCRIPTION OF THE DRAWINGS

FIGS. 1A and 1B are schematic view which shows a high pressure fuel injection pipe in accordance with embodiments of the invention, in which FIG. 1A is a vertical cross sectional view of an embodiment and FIG. 1B is a partially cut side elevational view of another embodiment;

DETAILED DESCRIPTION OF THE INVENTION

Figure 1A:
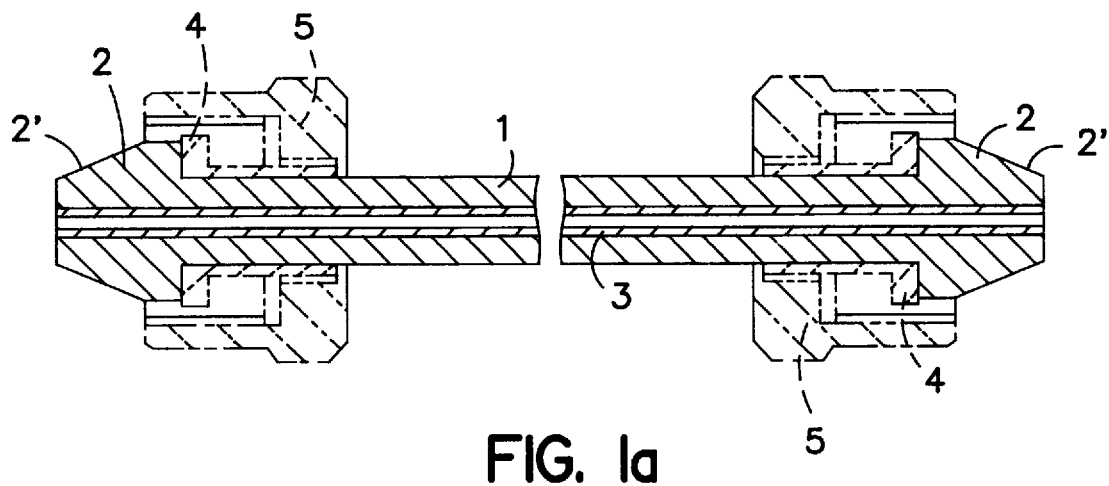
Figure 1B:
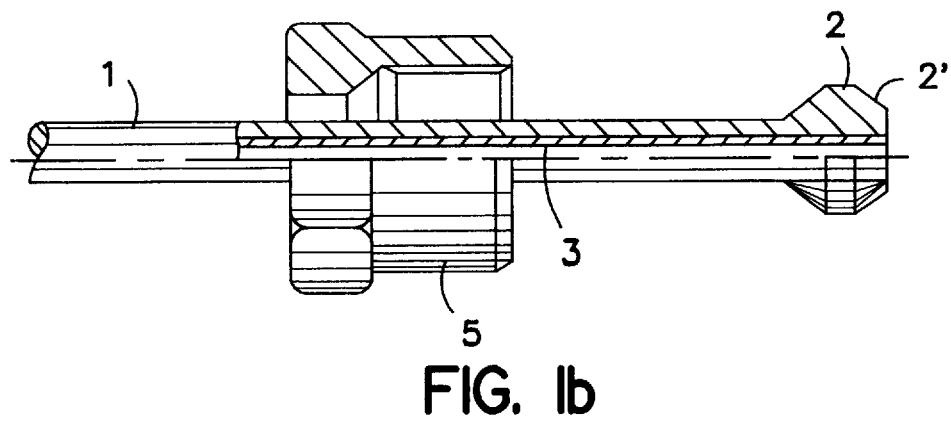

The invention will be described below with reference to attached drawings. Reference numeral 1 denotes a steel pipe for a high pressure piping having a pipe diameter of a relatively great thickness equal to or less than 20 mm and an inner narrow diameter, which is, for example, constituted by a single layer or a multi layers winding pipe made of a carbon steel, and reference numeral 3 denotes an internal pipe made of a thermally spring refined austenitic stainless steel press-fitted so as to be positioned inside the external pipe 1 and forming a communication passage therewithin, for example, a stainless steel pipe such as SUS304, SUS302 and SUS301 in a JIS standard. A high pressure fuel injection pipe is constituted by forming an injection pipe material comprising a double metal pipe by press-fitting the internal pipe 3 to the external pipe 1, and by forming a connection head portion 2 having a frusto-conical shape (refer to FIG. 1A), a circular arc shape and a counter shape (refer to FIG. 1B) on the connection end portion of the injection pipe material by a press molding.

In this case, in FIG. 1, reference numeral 4 denotes a sleeve washer fitted to a neck lower portion of the connection head portion 2 as occasion demands, and a fastening nut 5 which fastens a pressing surface 2' of the connection head portion 2 with an opposing member in a contact state with a pressure receiving surface of an opposing injection nozzle holder and an injection pump delivery holder (not shown) is assembled at the back of the sleeve washer 4 at the same time.

Figure 2:
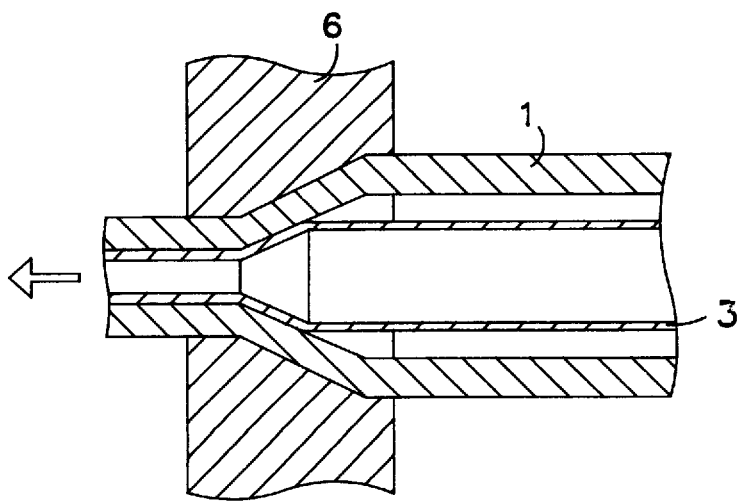
FIG. 2 is a partially cut vertical cross sectional view which shows a process of a method of manufacturing an injection pipe in accordance with the invention at a time of processing an extension pipe.

Next, a method of manufacturing a high pressure fuel injection pipe in accordance with the invention will be described below. The internal pipe 3 made of an austenitic stainless steel pipe is slowly inserted into the external pipe 1 made of a steel pipe pre-treated for cleaning. Next, as shown in FIG. 2, the injection pipe material constituted by a double metal pipe is formed by an extension pipe process due to an integral molding to a side shown by an arrow direction by means of a fixed die 6, by press-fitting the whole of the both pipes 1 and 3 all around the length by reducing a diameter thereof and at the same time by extending them.

Thereafter, when the injection pipe material constituted by the double metal pipe is inserted to a heating furnace and heated at a temperature of 375 to 455° C. and for 10 minutes to 24 hours, the internal pipe 3 made of an austenitic stainless steel pipe is thermally spring refined so that a hardness is further improved, and an extension of the internal pipe 3 performed a work hardening by an extension pipe process is recovered.

The reason why the heating temperature is set to be the range mentioned above is that a sufficient thermally spring refining effect can not obtained at a temperature less than 375° C. and on the contrary, when a temperature is over 455° C., there is a possibility of separation of a chrome carbonate due to sensitization. Further, the reason why the heating time is set to be the range mentioned above is that a sufficient thermally spring refining effect can not be obtained when the heating time is less than 10 minutes, and on the contrary, even when the heating is performed for over 24 hours, the thermal refining effect has no difference.

Figure 3:
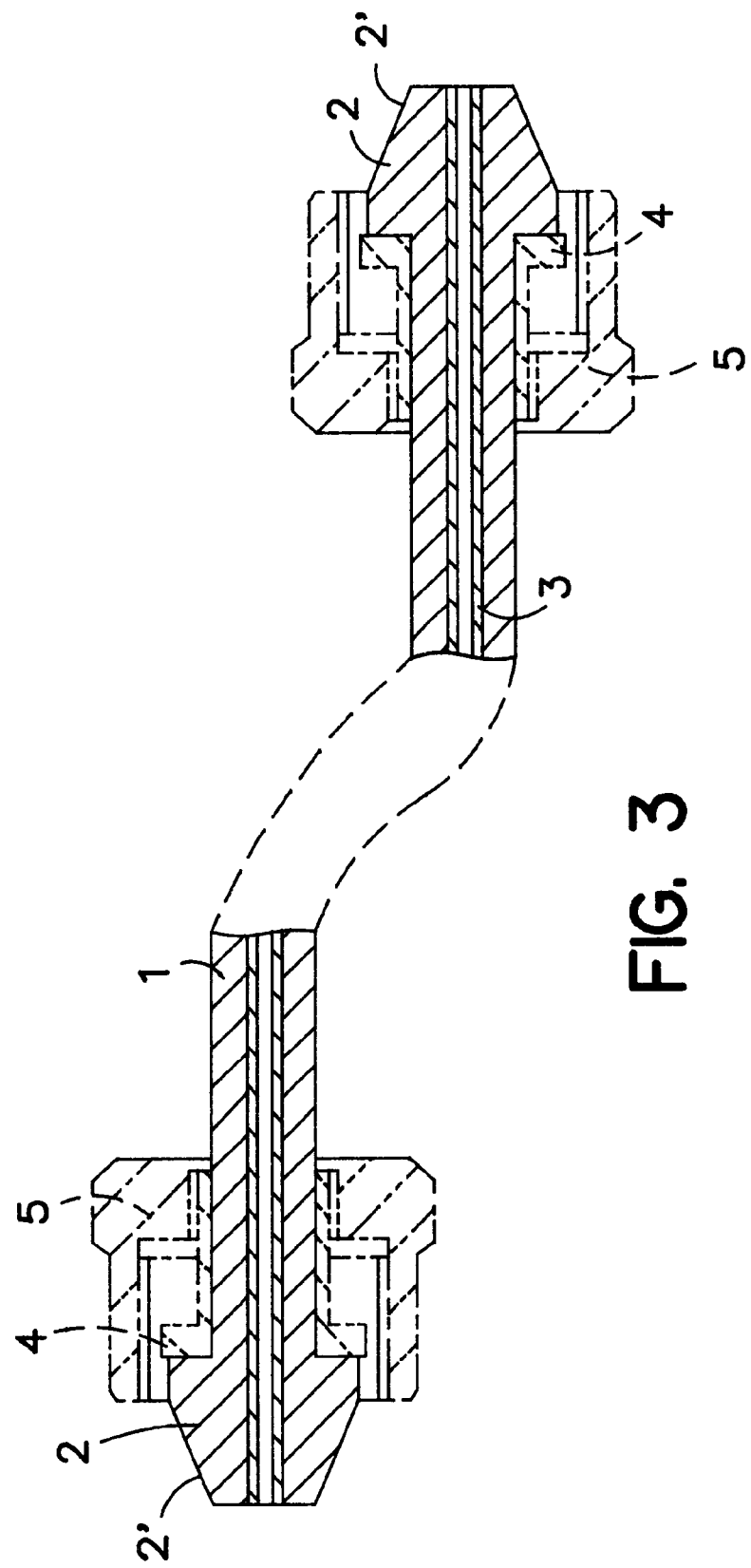
FIG. 3 is a schematic view similar to FIG. 1A showing the injection pipe after a bending process.

As mentioned above, the high pressure fuel injection pipe is constituted by forming the connection head portion having a frusto-conical shape, a circular arc shape or a counter shape in the connection end portion of the double metal pipe heated at a relatively low temperature by means of a press molding, and a bending process is normally performed thereafter as shown schematically in FIG. 3 so as to arrange near the diesel engine.

EXAMPLES

Next, an embodiment in accordance with the invention will be described below together with a comparative example.

With preparing an external pipe (an outer diameter: 11.0 mm, an inner diameter: 6.2 mm, a thickness: 2.4 mm) made of a steel pipe corresponding to STS35 performed a pre-treatment for cleaning and cut at a length of 3200 mm, and an internal pipe (an outer diameter: 4.5 mm, an inner diameter: 3.7 mm, a thickness: 0.5 mm) made of a stainless steel comprising SUS304 having a length of 3200 mm, the internal pipe is slowly inserted into the external pipe. Next, as shown in FIG. 2, an extension pipe process due to an integral drawing to one side as shown by an arrow is once performed by a fixed die so as to reduce a diameter all around the periphery, and thereafter, a leveling is performed so as to obtain an injection pipe material constituted by a double metal pipe having an outer diameter of 7.0 mm, an inner diameter of 2.5 mm and a thickness of 2.25 mm, and thereafter, twenty parts cut at a length of 300 mm are prepared.

The twenty injection pipe material prepared in the above manner are respectively cut at a center portion, and one group is prepared as test pieces for heating for 30 minutes, 60 minutes, 120 minutes and 240 minutes (the embodiment) and the other group is prepared as test pieces for keeping in a no-treatment state (the comparative example).

The heating furnace is maintained at a temperature of 400° C. and a heating process is performed under a heating time condition shown in the following Table 1 and Table 2, then a thermally spring refining of an internal pipe is performed. As a result of this, it is known that a hardness (Hv) of the internal pipe at two points a and b in a diametrical direction is increased as shown in Table 1 and Table 2.

TABLE 1

| Test Piece | After 30 minutes has passed | | | | Test Piece | After 60 minutes has passed | | | |
|---|---|---|---|---|---|---|---|---|---|
| | No-treatment | | Heat treatment | | | No-treatment | | Heat treatment | |
| | a | b | a | b | | a | b | a | b |
| 1 | 376 | 361 | 387 | 385 | 6 | 373 | 360 | 381 | 377 |
| 2 | 364 | 373 | 386 | 384 | 7 | 381 | 370 | 387 | 389 |
| 3 | 379 | 378 | 372 | 366 | 8 | 365 | 372 | 395 | 392 |
| 4 | 360 | 372 | 385 | 372 | 9 | 365 | 366 | 381 | 398 |
| 5 | 365 | 360 | 378 | 384 | 10 | 377 | 366 | 381 | 366 |
| Average | 368.8 | | 379.9 | | Average | 369.5 | | 384.7 | |

TABLE 2

| Test Piece | After 120 minutes has passed | | | | Test Piece | After 240 minutes has passed | | | |
|---|---|---|---|---|---|---|---|---|---|
| | No-treatment | | Heat treatment | | | No-treatment | | Heat treatment | |
| | a | b | a | b | | a | b | a | b |
| 11 | 376 | 372 | 376 | 378 | 16 | 379 | 377 | 380 | 376 |
| 12 | 362 | 354 | 379 | 394 | 17 | 367 | 354 | 390 | 384 |
| 13 | 375 | 359 | 392 | 405 | 18 | 356 | 354 | 385 | 377 |
| 14 | 369 | 360 | 374 | 385 | 19 | 375 | 379 | 393 | 392 |
| 15 | 375 | 359 | 387 | 366 | 20 | 378 | 360 | 395 | 388 |
| Average | 366.1 | | 383.6 | | Average | 367.9 | | 386 | |

Further, when an average extension is measured with respect to each of the test pieces, it is known that an extension is recovered.

Then, the high pressure fuel injection pipe as a product can be obtained by forming the connection head portion (an outer diameter: 9.5mm, a height: 4.0mm, a conical angle: 58 ) having a frusto-conical shape in the connection end portion of the injection pipe material constituted by the heated double metal pipe by a press molding and performing a bending process in a state of overlapping and attaching with the external pipe constituted by the steel pipe including the pressing surface.

As mentioned above, in accordance with the present invention, a sufficient anti-cavitation performance can be performed even when the high pressure fuel equal to or more than the value expected in the prior art, the extension is recovered by a heating operation even when a pipe extension is processed to a limit of an extension of the internal pipe constituted by a stainless steel pipe at a time of an extension pipe process so as to make a formation of the connection head portion in a connection end portion easy, and a necessary bending process at a time of arranging near a diesel engine can be performed.

What is claimed is:

1. A high pressure fuel injection pipe having opposed first and second ends, a thin internal pipe extending continuously from said first end to said second end, said internal pipe being made of a thermally spring-refined austenitic stainless steel, an external pipe extending continuously between said first and second ends, said external pipe defining a radial thickness greater than said internal pipe and being press-fitted to the internal pipe, the external pipe having a substantially uniform outside diameter at locations spaced from said first and second ends and having enlarged connection head portions adjacent the respective first and second ends, each said enlarged connection head portion comprising a substantially symmetrical convex pressing surface substantially at the respective first and second ends of the fuel injection pipe.

2. A high pressure fuel injection pipe as recited in claim 1, wherein said external pipe is a single layered winding pipe made of carbon steel.

3. A high pressure fuel injection pipe as recited in claim 1, wherein said internal pipe is made of a stainless steel selected from the group consisting of SUS304, SUS302 and SUS301 in a JIS standard.

4. A high pressure fuel injection pipe as recited in claim 1, wherein said external pipe is a multi-layered winding made of carbon steel.

5. A high pressure fuel injection pipe as recited in claim 1, wherein said outside diameter of said external pipe at locations spaced from said connection head portions is no greater than 20 mm.

6. A high pressure fuel injection pipe as recited in claim 5, wherein the external pipe has an initial radial thickness of approximately 2.25 mm.

7. A high pressure fuel injection pipe as recited in claim 6, wherein the internal pipe has an initial radial thickness of approximately 0.5 mm.

8. A high pressure fuel injection pipe as recited in claim 1, wherein said pressing surface of each said connection head portion has a substantially frusto-conical shape.

9. A high pressure fuel injection pipe as recited in claim 1, wherein said pressing surface of each said connection head portion has a substantially circular arc.

10. A high pressure fuel injection pipe as recited in claim 1, wherein the internal pipe has a substantially uniform outside diameter at aall locations between the ends.

11. A high pressure fuel injection pipe as recited in claim 1, wherein said high pressure fuel injection pipe has at least one bend therein at a location between said connection head portions such that said high pressure fuel injection pipe defines a selected non-linear shape.

12. A high pressure fuel injection pipe for peak internal pressures of approximately 1,400 bar, said high pressure fuel injection pipe having opposed first and second ends, a thin internal pipe extending continuously from said first end to said second end and having a substantially uniform outside diameter at all locations between said ends, said internal pipe being made of a thermally spring-refined austenitic stainless steel, an external pipe extending continuously between said first and second ends, said external pipe defining a radial thickness greater than said internal pipe and being press-fitted to the internal pipe, the external pipe having a substantially uniform outside diameter at locations spaced from said first and second ends and having enlarged connection head portions adjacent the respective first and second ends, each said enlarged connection head portion comprising a substantially symmetrical convex pressing surface substantially at the respective first and second ends of the fuel injection pipe, said high pressure fuel injection pipe being bent into a selected non-linear configuration.

* * * * *